United States Patent Office 3,336,229
Patented Aug. 15, 1967

3,336,229
CORROSION INHIBITION
Charles William Lutz, Clark, N.J., assignor to FMC Corporation, New York, N.Y., a corporation of Delaware
No Drawing. Filed Oct. 29, 1963, Ser. No. 319,675
8 Claims. (Cl. 252—136)

This invention relates to corrosion inhibition, and particularly to phosphorus-containing compositions which are inhibited against corrosion of mild steel and are stable against separation of components.

Concentrated aqueous phosphoric acid, having a concentration of about 60 to 85 weight percent of the acid, is widely used as a source of phosphorus in fertilizers and various other applications, such as modification of ensilage for animal feeds. In fertilizer use, it is employed in this highly concentrated form either directly or neutralized with ammonia or other nitrogen-containing compounds to produce aqueous solutions such as the 8–24 mixture (containing 8 weight percent nitrogen and 24 weight percent phosphorus as $P_2O_5$) and the corresponding 7–21, 15–15 and 10–20 mixtures. Very useful fertilizers are also compounded to contain potassium, the content of which is expressed as weight percent $K_2O$. A typically useful fertilizer of the latter type is designated 6–18–6, and contains by weight 6% of nitrogen, 18% of phosphorus as $P_2O_5$ and 6% of potassium as $K_2O$.

The use of concentrated phosphoric acid and its above derivatives has had two serious drawbacks, however. It is corrosive to inexpensive mild steel equipment which desirably would be employed in storing and shipping it, as well as in formulating and using the concentrated acid such as in preparation and use of compounds such as the 8–24, 6–18–6 and related fertilizers referred to above.

Accordingly, in the past it has been necessary to formulate, store and use concentrated phosphoric acid in expensive equipment formed of corrosion-resistant materials such as stainless steel or mild steel lined with rubbers or plastics resistant to the acid. Furthermore, inhibitors developed to reduce the attack of the aqueous acid and fertilizers on mild steel have exhibited only limited compatibility with these aqueous systems, with the result that they have frequently separated from them as gummy deposits which have interfered with practical usage of equipment. This poor compatibility has been particularly aggravated with the 6–18–6 fertilizer system, and even those inhibitors useful with 75% phosphoric acid and the 8–24 and related fertilizers have been found unsuitable for use with the 6–18–6 type of fertilizer.

It therefore is a feature of this invention to provide an inhibitor which substantially reduces the attack of concentrated, aqueous, phosphorus-containing solutions on mild steel.

It is a further feature to provide such an inhibitor having a high degree of compatibility in such systems, including the 6–18–6 type of fertilizer solutions, such that an effective concentration of the inhibitor remains in solution to carry out its function, and does not separate and create problems such as clogging of equipment, coating of walls and conveyors and the like.

It has now been found that the mixtures of (a) N-alkyl β-iminodipropionic acids and their alkali metal and ammonium salts having the following formula:

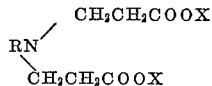

wherein R is constituted at least 70% of alkyl groups having 10–14 carbon atoms and the remainder of aliphatic groups having 8 to 18 carbon atoms, and preferably 12 carbon atoms, and X is hydrogen, sodium, potassium or ammonium, together with (b) 1,1,2-substituted sulfonated imidazolinium hydroxides and their alkali metal and ammonium salts having the following formula:

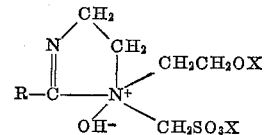

wherein R is constituted at least 70% of alkyl groups having 10–14 carbon atoms and the remainder of aliphatic groups having 8 to 18 carbon atoms, and preferably 12 carbon atoms, and X is hydrogen, sodium, potassium or ammonium, form base compositions which have a greater inhibiting effect on concentrated phosphorus-containing aqueous solutions than do either of the two ingredients alone. This ability to reduce corrosivity of the solutions is coupled with a high degree of compatibility with these solutions, such that even the difficulty compatible ammonium phosphate fertilizers, for example the 6–18–6 fertilizer, as well as concentrated phosphoric acid itself and other neutralized phosphoric acid solutions such as the 8–24 ammonium phosphate fertilizer, remain in solution in the phosphorus-containing aqueous solution and do not separate out providing gummy or other objectionable deposits.

The synergistic base mixture of these two ingredients is employed in the concentrated phosphorus-containing aqueous solution in the amount of at least about 0.07 total percent by weight based on the aqueous solution, to about 0.25 weight percent of the combination on this basis. The two ingredients normally are employed in relative proportions by weight of 1 to 10, and preferably of 1.3 to 4, parts by weight of the N-alkyl β-iminodipropionic acid compound to 1 part by weight of the second ingredient, provided the total amount of the two ingredients be between 0.07 to 0.25%. The dipropionic acid compound normally is employed in the form of its partial salt, in which one carboxyl group is converted to the sodium salt, often being sold in this form largely for reasons of its water solubility. The 1,1,2-substituted sulfonated imidazolinium hydroxide also normally is sold in the form of its sodium salt, again largely for reasons of solubility. However, it is obvious that in acid solution both compounds revert to their acid state, and the condition of the solution determines the condition in which the inhibitor additives are present in the solution.

The solutions which are inhibited by the present inhibitor mixture against corrosive attack on mild steel are concentrated phosphorus-containing aqueous solutions; phosphoric acid having a concentration of on the order of 75%, namely about 60 to 85 weight percent is used widely as a phosphorus source; alternatively, this acid frequently is employed, particularly when it is applied to the soil, after having been neutralized with ammonia to form aqueous ammonium phosphate fertilizer solutions such as the 8–24 or the difficultly compatible 6–18–6 types referred to above. The neutralized aqueous phosphate solutions normally are concentrated, containing about 20 to 40 weight percent of the fertilizer. Preferably they are near the saturation concentration for the given fertilizer.

The neutralized fertilizer composition may contain various mixtures of monoammonium phosphate, diammonium phosphate, ammonium nitrate, ammonium sulfate, urea, potassium chloride, potassium nitrate, potassium phosphate, dipotassium phosphate and the like admixed in any desired fashion. They may be formed by reaction of anhydrous ammonia, aqua ammonia, phosphoric acid, potassium hydroxide and the like to produce a salt solution. The mixtures are blended in common equipment to provide the fertilizer having the desired concentration of nitrogen and phosphorus, and if desired, potassium.

The most corrosive of the phosphorus-containing solutions toward mild steel equipment is concentrated phosphoric acid, and the least compatible of these solutions with inhibitors are the herein neutralized solutions. Accordingly, the corrosion tests shown by way of example hereinafter were carried out with concentrated phosphoric acid solutions, and the compatibility data shown includes data for the 8–24 and 6–18–6 compositions.

The inhibitor compositions of this invention contain as an essential ingredient, certain N-alkyl β-iminodipropionic acids and their alkali metal and ammonium salts. These compounds have the following formula:

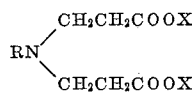

wherein R is constituted at least 70% of alkyl groups having 10–14 carbon atoms and the remainder of aliphatic groups having 8 to 18 carbon atoms, and preferably 12 carbon atoms, and X is hydrogen, sodium, potassium or ammonium. A convenient and highly useful form of the compound has the R groups as aliphatic groups derived from coconut oil. These compounds may be partial salts in which one of the carboxyl groups has been converted to the salt, and the other remains as the acid, although both can be either the salt or the acid group. Normally these materials are obtainable in the form of the partial salt; this is by reason of solubility in aqueous solution, and it will be obvious that depending upon the pH of the solution in which they are dissolved, they will be in the form of the acid or of the salt. It is interesting that while the compounds alone serve as inhibitors in phosphorus-containing fertilizers, they do not have sufficient inhibiting ability to be useful in practical compositions, in the absence of the additional ingredient described below.

The other essential ingredient of the inhibitor mixtures of this invention is a 1,1,2-substituted sulfonated imidazolinium hydroxide of the following formula:

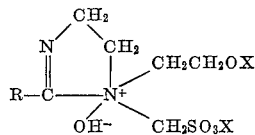

wherein R is constituted at least 70% of alkyl groups having 10–14 carbon atoms and the remainder of aliphatic groups having 8 to 18 carbon atoms, and preferably 12 carbon atoms, and X is hydrogen, sodium, potassium or ammonium. Those compounds from this class in which the R groups are aliphatic groups derived from coconut oil are particularly convenient and useful. These compounds normally are obtained as the sodium salts in which both X groups are sodium; as in the case of the other essential ingredient of the herein composition this is because of the solubility of the salts, and again the pH of the solution into which they are dissolved, determines the specific form of the compound in the solution. These compounds also have an inhibiting effect on concentrated phosphoric acid solutions although alone they are not sufficiently effective to serve as single component inhibitors. Furthermore, when used in substantial amounts in neutralized phosphoric acid solutions, e.g., the 8–24 and 6–18–6 mixtures, they have a tendency to separate from solution.

Mixtures of these two ingredients preferably are prepared to contain about 1.3 to 4 parts by weight of the N-alkyl β-iminodipropionic acid to about 1 part by weight of the other ingredient, although they may be used in proportions by weight of the two of about 1 to 10 parts of the N-alkyl β-iminodipropionic acid to 1 part of the other ingredient.

The relative proportions of the two ingredients employed in the particular composition is determined on the basis of the system being inhibited and the particular inhibiting compositions from the herein classes. The mixture is employed in a total amount of at least about 0.07 weight percent in the aqueous system being inhibited. Normally no more than about 0.25 weight percent of the mixture is used in the system since use of substantially more than this amount may cause incompatibility of the inhibitor with the phosphorus-containing solution, and in any event is undesirable economically and not necessary.

As much as about equal amounts of additional corrosion inhibiting ingredients can be employed together with the up to about 0.25 weight percent of the herein base inhibitor mixture in order to improve the corrosion inhibiting properties and other properties of the mixture, particularly over extended periods. Anti-foaming agents, such as the silicone anti-foaming agents, anti-pitting agents such as tolyl mercapto acetic acid and other agents of this type, and additional materials such as propargyl alcohol, isopropyl alcohol and the like may be employed, as may be additional inhibitors.

The herein inhibitors preferably are predissolved in a solvent such as water or an alcohol such as isopropanol or other alcohol alone or with water, and added with stirring in this form to the acid or ammonium phosphate system to be inhibited, to form clear solutions. The mixing and subsequent storage and use can be carried out safely even in mild steel equipment by reason of the excellent corrosion inhibiting character of the present mixtures, and is not accompanied by separation of inhibitor from solution. This is in marked contrast to the difficulties encountered when most prior inhibitors have been employed.

*Example 1*

Mild steel specimens, 3″ x 1½″ x 1/32″ strips conforming to AISI 1010 cold rolled specifications, were cleaned by surface grinding, edge polishing and degreasing in acetone and dried. They were then weighed to ±0.1 mg.

The mild steel strips prepared in this manner were then placed in beakers containing 490 g. of 75% phosphoric acid held at 50° C. At the end of one day, the strips were removed, water rinsed, dried and weighed. The rate of corrosion during the one day period was determined in mils per year (MPY). Calculations to determine the MPY were carried out using the following formula:

If $W$=loss in weight (in grams) of the test piece during the time of immersion, $A$=area of the test piece in square inches, $S$=density of the metal in grams per cubic centimeter, $T$=time of exposure in hours, and $MPY$=the rate of chemical corrosion expressed as mils penetration per year, then $$MPY = \frac{1000 \times 24 \times 30 \times 12 \times W}{(2.54)^3 \, AST}$$

Since $A$=9.0 sq. in. and $S$=7.80, $$MPY = \frac{1000 \times 24 \times 30 \times 12 \times W}{(2.54)^3 \times 9 \times 7.8 \times T}$$

for this test.

A rate of corrosion of 50 MPY would thus mean a metal loss of 0.158 g. during the one day period of immersion. An MPY of under about 10 in the 24 hour tests presented below is considered acceptable with these particular test specimens, but lower values are even more desirable. The values obtained in these tests can be correlated to values obtained with other kinds of test specimens, but are not directly interchangeable therewith.

The following table shows the results of a series of tests carried out by the test method referred to above, employing the ingredients of the herein inhibitor mixture. Table 1(A) shows examples of inhibitor mixtures within the scope of this invention, whereas Table 1(B) shows comparative examples of inhibitors not having the advantages of those covered by this invention.

In these tables the N-alkyl β-iminodipropionic acid compound (AIPA) and the 1,1,2-substituted sulfonated imidazolinium hydroxide compound (SIAH) employed in the examples are as follows:

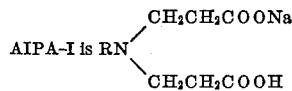

AIPA-I is RN⟨CH₂CH₂COONa / CH₂CH₂COOH⟩ wherein R are aliphatic groups derived from coconut oil.

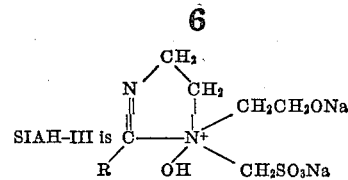

SIAH-III is (structure shown)

wherein R is the dodecyl group.

TABLE 1 (A)

| Ex. | Inhibitor System | Component Concentration [1] | Total Concentration [1] | Corrosion Rate, MPY [2] | Compatibility 75% H₃PO₄ | Compatibility 6-18-6 Ammonium Phosphate | Compatibility 8-24-0 Ammonium Phosphate |
|---|---|---|---|---|---|---|---|
| 1 | AIPA-I / SIAH-I | 0.18 / 0.02 | 0.2 | 8 | Yes | Yes | Yes |
| 2 | AIPA-I / SIAH-I | 0.16 / 0.04 | 0.2 | 6 | Yes | Yes | Yes |
| 3 | AIPA-I / SIAH-I | 0.12 / 0.08 | 0.2 | 6 | Yes | Yes | Yes |
| 4 | AIPA-I / SIAH-I | 0.1 / 0.1 | 0.2 | 6 | Yes | Yes | Yes |
| 5 | AIPA-I / SIAH-I | 0.04 / 0.03 | 0.07 | 9 | Yes | Yes | Yes |
| 6 | AIPA-I / SIAH-I | 0.20 / 0.05 | 0.25 | 7 | Yes | Yes | Yes |
| 7 | AIPA-III / SIAH-I | 0.12 / 0.08 | 0.2 | 5 | Yes | Yes | Yes |
| 8 | AIPA-II / SIAH-II | 0.12 / 0.08 | 0.2 | 6 | Yes | Yes | Yes |
| 9 | AIPA-III / SIAH-III | 0.10 / 0.05 | 0.15 | 7 | Yes | Yes | Yes |

See footnotes, Table 1(B).

TABLE 1 (B)

[Comparative examples]

| Ex. | Inhibitor System | Component Concentration [1] | Total Concentration [1] | Corrosion Rate, MPY [2] | Compatibility 75% H₃PO₄ | Compatibility 6-18-6 Ammonium Phosphate | Compatibility 8-24-0 Ammonium Phosphate |
|---|---|---|---|---|---|---|---|
| 10 | AIPA-I / SIAH-I | 0.03 / 0.03 | 0.06 | 15 | --- | --- | --- |
| 11 | AIPA-I / SIAH-I | 0.04 / 0.02 | 0.06 | 12 | --- | --- | --- |
| 12 | AIPA-I / SIAH-I | 0.04 / 0.06 | 0.1 | --- | Yes | Yes | No |
| 13 | AIPA-I | 0.3 | 0.3 | 12 | --- | --- | --- |
| 14 | AIPA-I | 0.2 | 0.2 | 14 | --- | --- | --- |
| 15 | SIAH-I | 0.2 | 0.2 | 27 | --- | --- | --- |

[1] Concentrations expressed in terms of amount of ingredient in the aqueous phosphorus-containing solution as weight percent of the active ingredient.
[2] One day at 50° C.

These groups contain about 8% of octyl, 9% of decyl, 47% of dodecyl, 18% of tetradecyl, 8% of hexadecyl, 10% of octadecyl and the remainder various saturated and unsaturated aliphatic groups.

AIPA-II is RN⟨CH₂CH₂COOH / CH₂CH₂COOH⟩

AIPA-III is RN⟨CH₂CH₂COONH₄ / CH₂CH₂COONH₄⟩ wherein R is the dodecyl group.

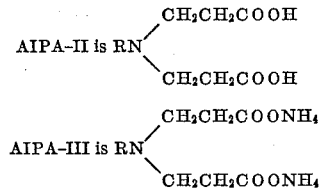

SIAH-I is (structure shown)

wherein R are aliphatic groups derived from coconut oil.

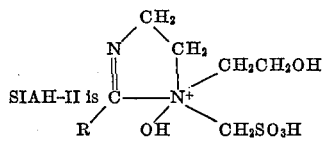

SIAH-II is (structure shown)

It will be seen from the above examples that even in the highly corrosive aqueous phosphorus-containing solution, particularly the 75% phosphoric acid, the present inhibitor mixture provides a strong inhibiting action against corrosion of mild steel by the solution. This inhibiting ability of the herein mixtures is accompanied by the ability to remain in solution, without separation therefrom, even with neutralized solutions such as the 8–24 or 6–18–6 ammonium phosphates. This quality of the inhibitor mixtures is surprisingly good when it is considered that neither of the two ingredients alone is a satisfactory, compatible inhibitor.

This combination of compatibility of the inhibitor with the concentrated phosphorus-containing aqueous solution, together with its excellent inhibition of corrosion of mild steel by the solution, is most important. Concentrated phosphorus-containing solutions must be transported and stored, and inhibitor systems which separate from the solution may not continuously contain sufficient inhibitor in solution to guard against attack on transport or storage equipment. The present inhibitor makes it possible to employ inexpensive mild steel equipment for mixing, transport and storage of concentrated, phosphorus-containing solutions without fear of excessive corrosion of the steel.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

I claim:

1. Aqueous phosphorus-containing solution resistant to separation of components and inhibited against corrosion of mild steel, said aqueous solution having a phosphorus-containing ingredient from the group consisting of aqueous concentrated phosphoric acid solution and aqueous ammonium phosphate solutions, and essentially containing as a base inhibitor against said corrosion, a mixture of (a) an N-alkyl β-iminodipropionic acid compound having the following formula:

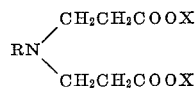

wherein R is constituted at least 70% of alkyl groups having 10–14 carbon atoms and the remainder of aliphatic groups having 8 to 18 carbon atoms, and X is a member from the group consisting of hydrogen, sodium, potassium and ammonium, and (b) a 1,1,2-substituted sulfonated imidazolinium hydroxide having the following formula:

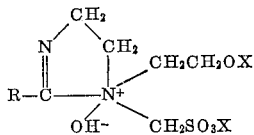

wherein R is constituted at least 70% of alkyl groups having 10–14 carbon atoms and the remainder of aliphatic groups having 8 to 18 carbon atoms, and X is a member from the group consisting of hydrogen, sodium, potassium and ammonium, in the relative proportions of 1:1 to 10:1 of (a) to (b), said mixture being present in the amount of 0.07 to 0.25% by weight of the solution.

2. Solution of claim 1 in which the R groups in compounds (a) and (b) are derived from coconut oils.

3. Solution of claim 1 in which the R groups in compounds (a) and (b) are dodecyl groups.

4. Solution of claim 1 in which the inhibitor mixture contains proportions of compound (a) to compound (b) of 1.3:1 to 4:1.

5. Composition for inhibiting an aqueous phosphorus-containing solution from the group consisting of aqueous concentrated phosphoric acid solutions and aqueous ammonium phosphate solutions against corrosion of mild steel, said composition consisting essentially of (a) an N-alkyl β-iminodipropionic acid compound having the following formula:

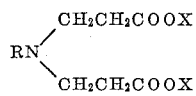

wherein R is constituted at least 70% of alkyl groups having 10–14 carbon atoms and the remainder of aliphatic groups having 8 to 18 carbon atoms, and X is a member from the group consisting of hydrogen, sodium, potassium, and ammonium, and (b) a 1,1,2-substituted sulfonated imidazolinium hydroxide having the following formula:

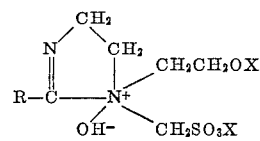

wherein R is constituted at least 70% of alkyl groups having 10–14 carbon atoms and the remainder of aliphatic groups having 8 to 18 carbon atoms, and X is a member from the group consisting of hydrogen, sodium, potassium and ammonium, in the relative proportions of 1:1 to 10:1 of (a) to (b).

6. Composition of claim 5 in which the R groups in compounds (a) and (b) are derived from coconut oils.

7. Composition of claim 5 in which the R groups in compounds (a) and (b) are dodecyl groups.

8. Composition of claim 5 in which the relative proportions of compound (a) to compound (b) are 3:1 to 4:1.

References Cited

UNITED STATES PATENTS

| | | | |
|---|---|---|---|
| 2,781,357 | 2/1957 | Mannheimer | 260—309.6 |
| 2,790,778 | 4/1957 | Spivack et al. | 252—392 |
| 2,985,662 | 5/1961 | Johnson et al. | 252—391 X |
| 3,060,007 | 10/1962 | Freedman | 252—392 X |
| 3,197,301 | 7/1965 | Lutz | 252—392 X |

LEON D. ROSDOL, *Primary Examiner.*

M. WEINBLATT, *Assistant Examiner.*